US010952134B2

(12) United States Patent
Young et al.

(10) Patent No.: US 10,952,134 B2
(45) Date of Patent: *Mar. 16, 2021

(54) METHODS AND SYSTEMS FOR INTELLIGENT AMF ASSIGNMENT TO MINIMIZE RE-DIRECTION

(71) Applicant: Verizon Patent and Licensing Inc., Basking Ridge, NJ (US)

(72) Inventors: Kristen Sydney Young, Morris Plains, NJ (US); Ravi Potluri, Coppell, TX (US); Hans Raj Nahata, New Providence, NJ (US)

(73) Assignee: Verizea Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/061,777

(22) Filed: Oct. 2, 2020

(65) Prior Publication Data

US 2021/0022072 A1 Jan. 21, 2021

Related U.S. Application Data

(63) Continuation of application No. 16/423,304, filed on May 28, 2019, now Pat. No. 10,856,217.

(51) Int. Cl.
*H04W 48/18* (2009.01)
*H04W 8/02* (2009.01)
(Continued)

(52) U.S. Cl.
CPC ............. *H04W 48/18* (2013.01); *H04W 8/02* (2013.01); *H04W 48/16* (2013.01); *H04W 72/10* (2013.01); *H04W 88/18* (2013.01); *H04W 60/00* (2013.01)

(58) Field of Classification Search
CPC ....... H04W 48/18; H04W 88/18; H04W 8/02; H04W 48/16; H04W 72/10; H04W 60/00; H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS 10,499,357 B1    12/2019    Tiwari et al.
10,506,506 B2 *  12/2019    Qiao .................... H04W 48/18
(Continued)

OTHER PUBLICATIONS

Shorov, Andrey. "5g testbed development for network slicing evaluation." 2019 IEEE Conference of Russian Young Researchers in Electrical and Electronic Engineering (ElConRus). IEEE, 2019. (Year: 2019).*

*Primary Examiner* — Sharad Rampuria

(57) ABSTRACT

A method, a system, and a non-transitory storage medium are described in which an access and mobility management function (AMF) assignment service is provided. A network device receives an assignment policy for selecting an AMF from a group of available AMFs, wherein the assignment policy includes network slice priorities for available network slices in the RAN; stores the assignment policy; receives, during a registration procedure initiated by an end device, Network Slice Selection Assistance Information (NSSAI); identifies, from the NSSAI, multiple single-NSSAIs (S-NSSAIs); and selects, based on the assignment policy, an AMF for a highest priority S-NSSAI, of the multiple S-NSSAIs.

20 Claims, 9 Drawing Sheets

(51) Int. Cl.
*H04W 72/10* (2009.01)
*H04W 48/16* (2009.01)
*H04W 88/18* (2009.01)
*H04W 60/00* (2009.01)

(56) References Cited

U.S. PATENT DOCUMENTS

2019/0200285 A1\* 6/2019 Velev .................... H04W 8/02
2019/0261185 A1   8/2019 Velev
2020/0092424 A1\* 3/2020 Qiao .................... H04M 15/66

\* cited by examiner

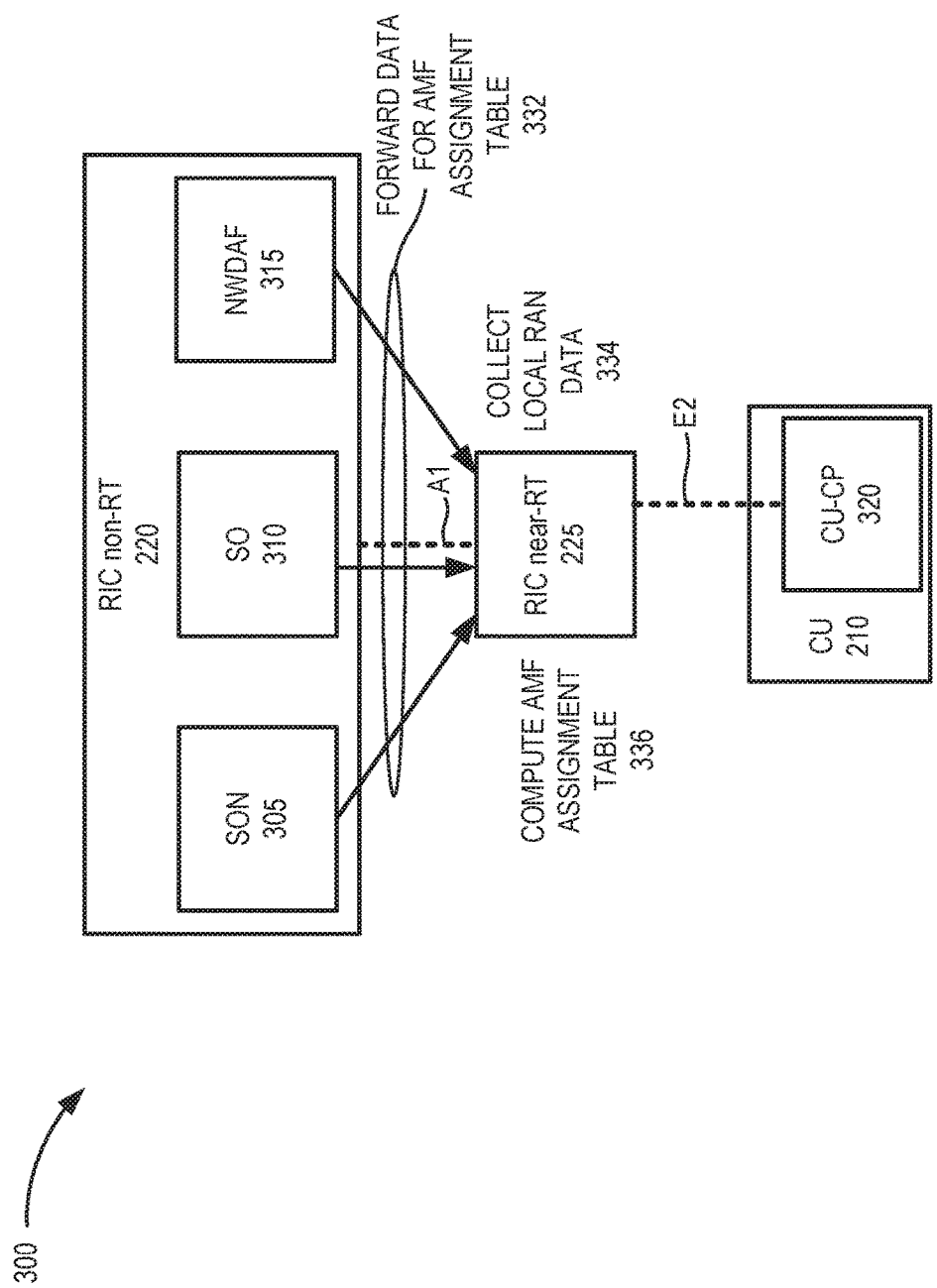

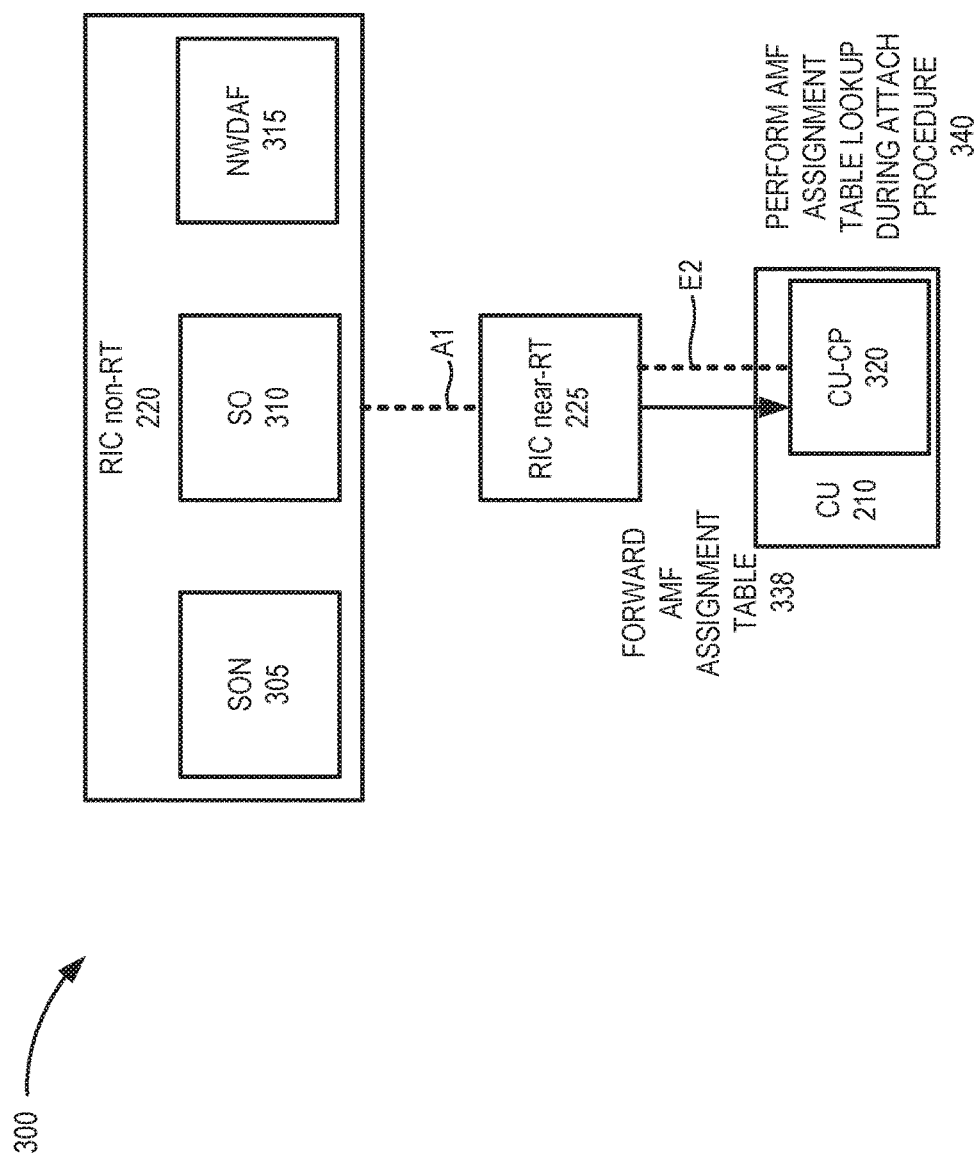

Fig. 4

AMF ASSIGNMENT TABLE

| S-NSSAI | AMF | SLICE PRIORITY |
|---|---|---|
| Missing | AMF = w | 0 |
| Default S-NSSAI | AMF = x | 0 |
| S-NSSAI = a | AMF = y | 1 |
| S-NSSAI = b | AMF = z | 5 |
| ... | ... | ... |
| S-NSSAI = h | AMF = i | P |

- 440-1, 440-2, 440-3, 440-4, ..., 440-x
- 410 (S-NSSAI), 420 (AMF), 430 (SLICE PRIORITY)
- 400

METHODS AND SYSTEMS FOR INTELLIGENT AMF ASSIGNMENT TO MINIMIZE RE-DIRECTION

CROSS-REFERENCE TO RELATED APPLICATION

This application is a continuation of U.S. patent application Ser. No. 16/423,304, entitled "Methods and Systems for Intelligent AMF Assignment to Minimize Re-Direction," filed on May 28, 2019, the contents of which are hereby incorporated by reference.

BACKGROUND

Development and design of radio access networks (RAN) and core networks present certain challenges from a network-side perspective and an end device perspective. For example, depending on the configurations from both network-side and end device-side perspectives, such configurations may reduce the effective use of resources.

BRIEF DESCRIPTION OF THE DRAWINGS

FIG. 3A-3C are diagrams illustrating an exemplary process of an embodiment of the intelligent AMF assignment service;

FIG. 4 is a diagram illustrating an exemplary embodiment of an AMF assignment table for the intelligent AMF assignment service;

DETAILED DESCRIPTION OF PREFERRED EMBODIMENTS

Figure 1:
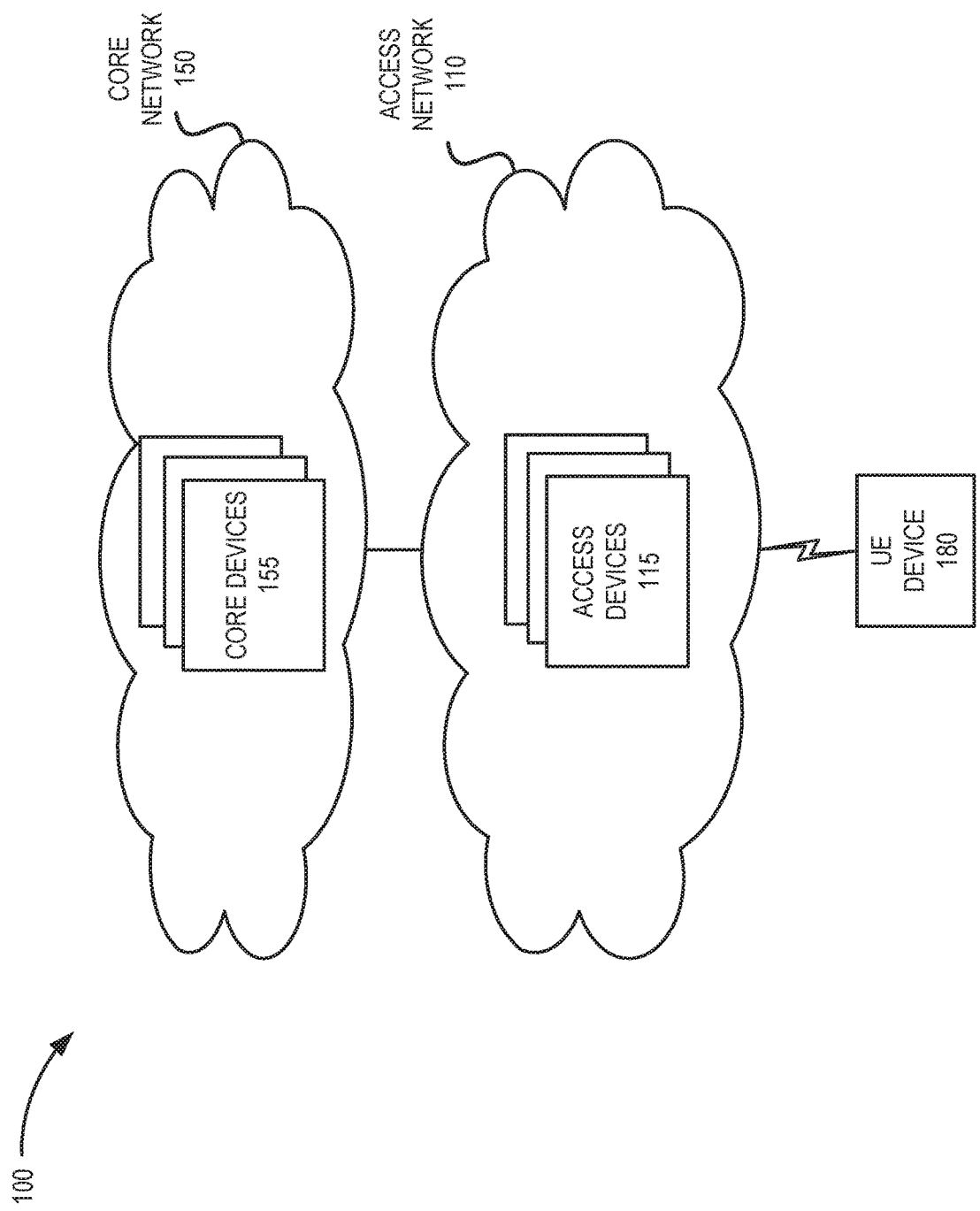
FIG. 1 is a diagram illustrating an exemplary environment in which an embodiment of an intelligent access and mobility management function (AMF) assignment service may be implemented.

The following detailed description refers to the accompanying drawings. The same reference numbers in different drawings may identify the same or similar elements. Also, the following detailed description does not limit the invention.

Using network slicing, a physical network may be sectioned (or "sliced") into multiple, virtual, end-to-end networks. Each network slice may be dedicated for different types of services with different characteristics and requirements (e.g., latency, voice, jitter, bandwidth, pricing, enterprise, etc.). As used herein, the term "slice" or "network slice" refers to a complete logical network including a Radio Access Network (RAN) and Core Network that provides certain telecommunication services and network capabilities that can vary from slice to slice. Selection of network slices can, thus, have significant impact on network performance and user experience.

In some instances, user equipment (UE, also referred to herein as an end device) may be configured to use a particular network slice upon connection to a network (e.g., a Fifth Generation (5G) network). For example, an Internet-of-Things (IoT) device may be designated with a particular slice identifier that matches network slice characteristics to the type of traffic generated by the IoT device. End devices that connect to the network may be assigned to an access and mobility management function (AMF) that performs registration management, connection management, etc., for the end device. There may be multiple AMF instances and each AMF instance (or a set of AMF instances) may be associated with one or more network slices.

In current 5G networks, the RAN has information identifying a default AMF to associate with an end device during initial registration. In addition, the 5G core network may redirect the end device to a different AMF or AMF set after determining the set of network slices that the end device is allowed to use, together with additional information such as slice availability in the current registration area, etc. These redirections consume additional network resources and introduce latency in completing the initial attach process. Currently, there is no consideration to address or minimize the amount of redirections. Furthermore, RAN conditions and core network conditions are not taken into account during initial registration, which may result in overloading of a default AMF or underutilization of a different AMF.

Systems and methods described herein provide capabilities in the RAN to perform intelligent AMF selection during initial registration, including a framework by which RAN and core network conditions are factored into the selection process. According to exemplary embodiments, an intelligent AMF assignment service is described. A network device receives an assignment policy for selecting an AMF from a group of available AMFs, wherein the assignment policy includes network slice priorities for available network slices in the RAN; stores the assignment policy; receives, during a registration procedure initiated by an end device, Network Slice Selection Assistance Information (NSSAI); identifies, from the NSSAI, multiple single-NSSAIs (S-NSSAIs); and selects, based on the assignment policy, an AMF for a highest priority S-NSSAI, of the multiple S-NSSAIs (such as when the assignment policy indicates there is no single AMF designated to provide service to the end device for all of the S-NSSAIs in the NSSAI).

As a result, the intelligent AMF assignment service may improve network resource utilization in a network. For example, the intelligent AMF assignment service may minimize redirection, which reduces network resource consumption. Additionally, adding RAN and core network conditions into the AMF selection process provides an end-to-end view of the network and improves the initial selection result.

FIG. 1 is a diagram illustrating an exemplary environment 100 in which an exemplary embodiment of the application-based access control service may be implemented. As illustrated, environment 100 includes an access network 110 and a core network 150. Access network 110 includes access devices 115, and core network 150 includes core devices 155. Environment 100 further includes UE 180.

The number, the type, and the arrangement of network devices in access network 110 and core network 150, as illustrated and described, are exemplary. The number of UE devices 180 is also exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture. Access devices 115 and core devices 155 may each include a network device.

Environment 100 includes communication links between the network devices, and between UE 180 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the application-based access control service may use at least one of these planes of communication. Additionally, an interface of a network device may be modified in order to support the communication (e.g., transmission and reception of messages, information elements (IE), attribute value pairs (AVPs), etc.) between network devices and the application-based access control service, as described herein. According to various exemplary implementations, the interface may be a service-based interface or a reference point-based interface.

Access network 110 may establish and maintain, with participation from UE 180, an over-the-air channel with UE 180; and maintain backhaul channels with core network 150. Access network 110 may convey information through these channels, from UE 180 to core network 150 and vice versa. Access network 110 may include one or multiple networks of one or multiple types and technologies. For example, access network 110 may include a 5G RAN. In another implementation access network 110 may include a 5G RAN with a Fourth Generation (4G) RAN, a 4.5G RAN, and/or another type of future generation RAN. By way of further example, access network 110 may be implemented to include a New Radio (NR) RAN, an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 110 may further include other types of wireless networks that may provide an on-ramp to access devices 115 and/or core network 150. Additionally, according to various exemplary embodiments, access network 110 may be implemented according to various wireless technologies (e.g., radio access technology (RAT), etc.), wireless standards, wireless frequencies/bands/carriers, licensed radio spectrum, unlicensed radio spectrum, and/or other attributes of radio communication.

Access network 110 may include different and multiple functional splitting, such as different combinations of access network 110 and core network 150 including an Evolved Packet Core (EPC) network and/or a 5G core (5GC) network, or the splitting of the various layers (e.g., physical layer, Media Access Control (MAC) layer, Radio Link Control (RLC) layer, and Packet Data Convergence Control (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), network slicing, coordinated multi-point (CoMP), various duplex schemes (e.g., frequency division duplex (FDD), time division duplex (TDD), half-duplex FDD (H-FDD), etc.), and/or another type of connectivity service.

Depending on the implementation, access network 110 may include one or multiple types of network devices, such as access devices 115. For example, access devices 115 may include a next generation Node B (gNB), an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to an exemplary embodiment, access device 115 includes logic that provides the intelligent AMF assignment service, as described herein.

Core network 150 may include one or multiple networks of one or multiple types and technologies. According to an exemplary embodiment, core network 150 includes a network to connect and manage different parts of access network 110. For example, core network 150 may be implemented to include a 5G core network (also referred to as a next generation core (NGC) network), an EPC of an LTE, a core network of an LTE-Advanced (LTE-A) network, and/or a core network of an LTE-A Pro network. Core network 150 may include a legacy core network.

Depending on the implementation, core network 150 may include various types of network devices, such as core devices 155. For example, core devices 155 may include a packet gateway (PGW), a serving gateway (SGW), a home subscriber server (HSS), an authentication, authorization, and accounting (AAA) server, a policy charging and rules function (PCRF), a charging system (CS), a user plane function (UPF), an AMF, a mobility management entity (MME), a session management function (SMF), a unified data management (UDM) device, an authentication server function (AUSF), a network slice selection function (NSSF), a network repository function (NRF), a policy control function (PCF), a network exposure function (NEF), and/or an application function (AF). According to other exemplary implementations, core devices 155 may include additional, different, and/or fewer network devices than those described. For example, core devices 155 may include a non-standard and/or proprietary network device.

UE 180 includes a device that has computational and wireless communication capabilities. Depending on the implementation, UE 180 may be a mobile device, a portable device, a stationary device, a device operated by a user, or a device not operated by a user. For example, UE 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or other types of wireless end nodes. By way of further example, UE 180 may be implemented as a smartphone, a personal digital assistant, a tablet, a netbook, a wearable device (e.g., a watch, glasses, etc.), a set top box, an infotainment system in a vehicle, a vehicle support system, a smart television, a game system, or other types of wireless end devices.

UE 180 may support one or multiple RATs (e.g., 4G, 5G, etc.) and various portions of the radio spectrum (e.g., multiple frequency bands, multiple carrier frequencies, licensed, unlicensed, etc.), network slicing, DC service, and/or other types of connectivity services. Additionally, UE 180 may include one or multiple communication interfaces that provide one or multiple (e.g., simultaneous) connections via the same or different RATs, frequency bands, carriers, network slices, and so forth. The multimode capabilities of UE 180 may vary among UEs 180.

Figure 2:
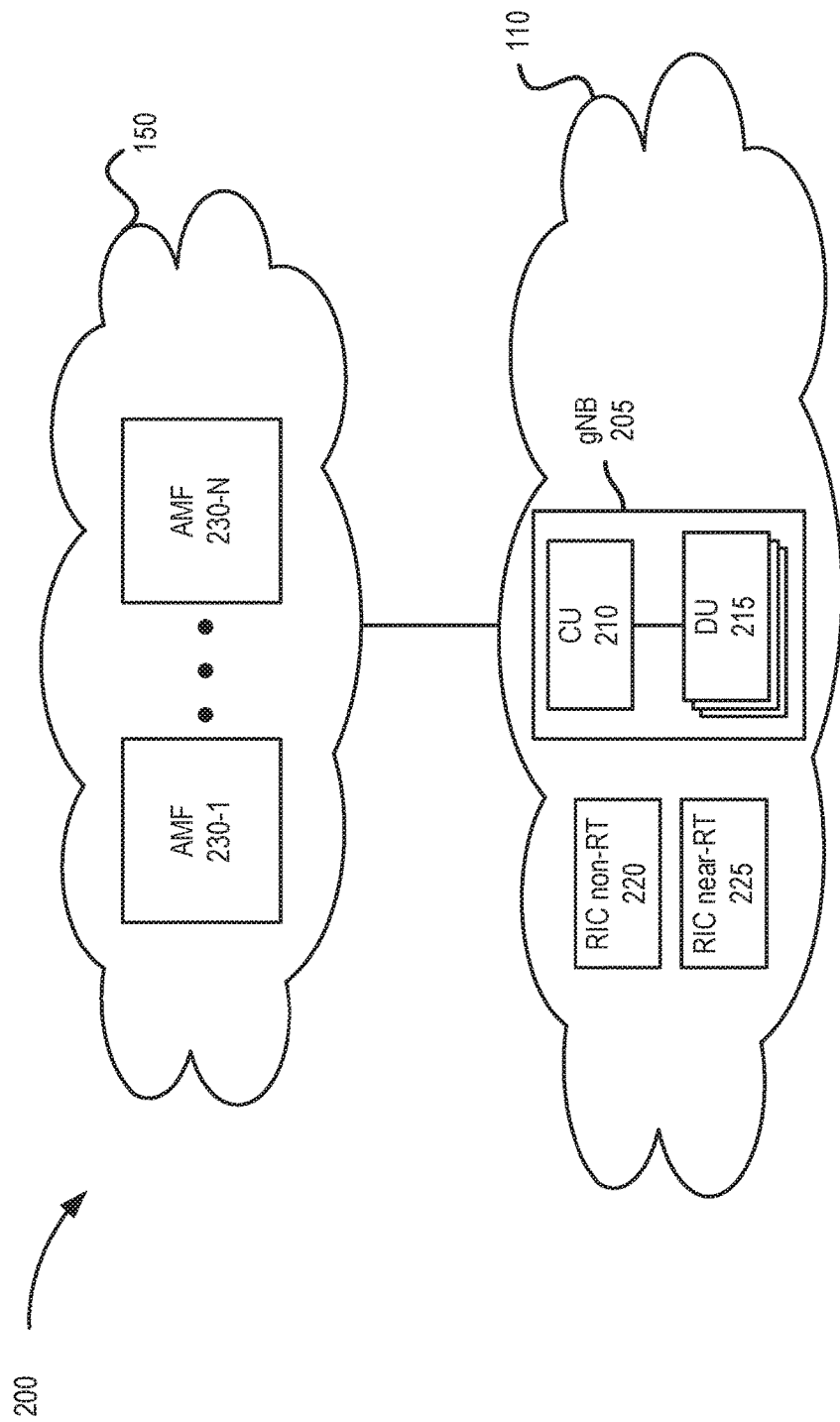
FIG. 2 is a diagram illustrating components in a portion of the environment of FIG. 1.

FIG. 2 is a diagram illustrating components in a portion 200 of environment 100. As illustrated, environment 200 may include access network 110 and core network 150. Core network 150 may include multiple AMFs 230-1 through AMF 230-N (e.g., corresponding to core devices 155). As used herein AMF 230 may include a single AMF 230 or an AMF set. An "AMF Set" may include of one or more functionally equivalent AMFs for load balancing purposes. As used herein, an AMF selection and AMF Set selection are used interchangeably. If an AMF Set is selected, then it is assumed an individual AMF, or a most suitable AMF, is selected from the set based on, for example, loading information and/or capacity.

In the exemplary configuration of FIG. 2, access network 110 may correspond to an Open RAN (or O-RAN), such as a RAN that implements architectures described under the O-RAN Alliance. Implementations described herein make use of the O-RAN framework and its interfaces, although other RAN architectures may be used.

Access network 110 may include a gNB 205, a non-real-time RAN Intelligent Controller (RIC-non-RT) 220, and a near-real-time RAN Intelligent Controller (RIC-near-RT) 225. According to an implementation, gNB 205 may correspond to access device 115 described above. gNB 205 may include a distributed architecture, including a centralized unit (CU) 210 and multiple distributed units (DU) 215. In some implementation, CU 210 and a DU 215 may be co-located.

RIC-non-RT 220 and RIC-near-RT 225 may be implemented as functional layers of a single component (e.g., a single RIC device) or as separate components. For example, RIC-non-RT 220 may be included in an orchestration layer of a network management system (NMS), while RIC-near-RT 225 may be included within gNB 205.

RIC-non-RT 220 may provide service and policy management, RAN analytics, and model-training for RIC-near-RT 225. RIC-non-RT 220 may produce trained models and real-time control functions, which may be distributed to RIC-near-RT 225 for runtime execution. According to an implementation described herein, RIC-non-RT 220 may provide network data to RIC-near-RT 225 to support computation of an AMF assignment table.

RIC-near-RT 225 may operate at near-real-time response times (e.g., response times under one second), provide control functionality and interfaces with CU 210 and/or DU 215 in access network 110. According to an implementation described herein, RIC-near-RT 225 may receive network data from RIC-non-RT 220 and compute/update an AMF assignment table. RIC-near-RT 225 may provide the AMF assignment table to gNB 205 (e.g., CU 210) to perform intelligent selection of an initial AMF 230 in real time, during UE registration procedure.

Figure 3A:
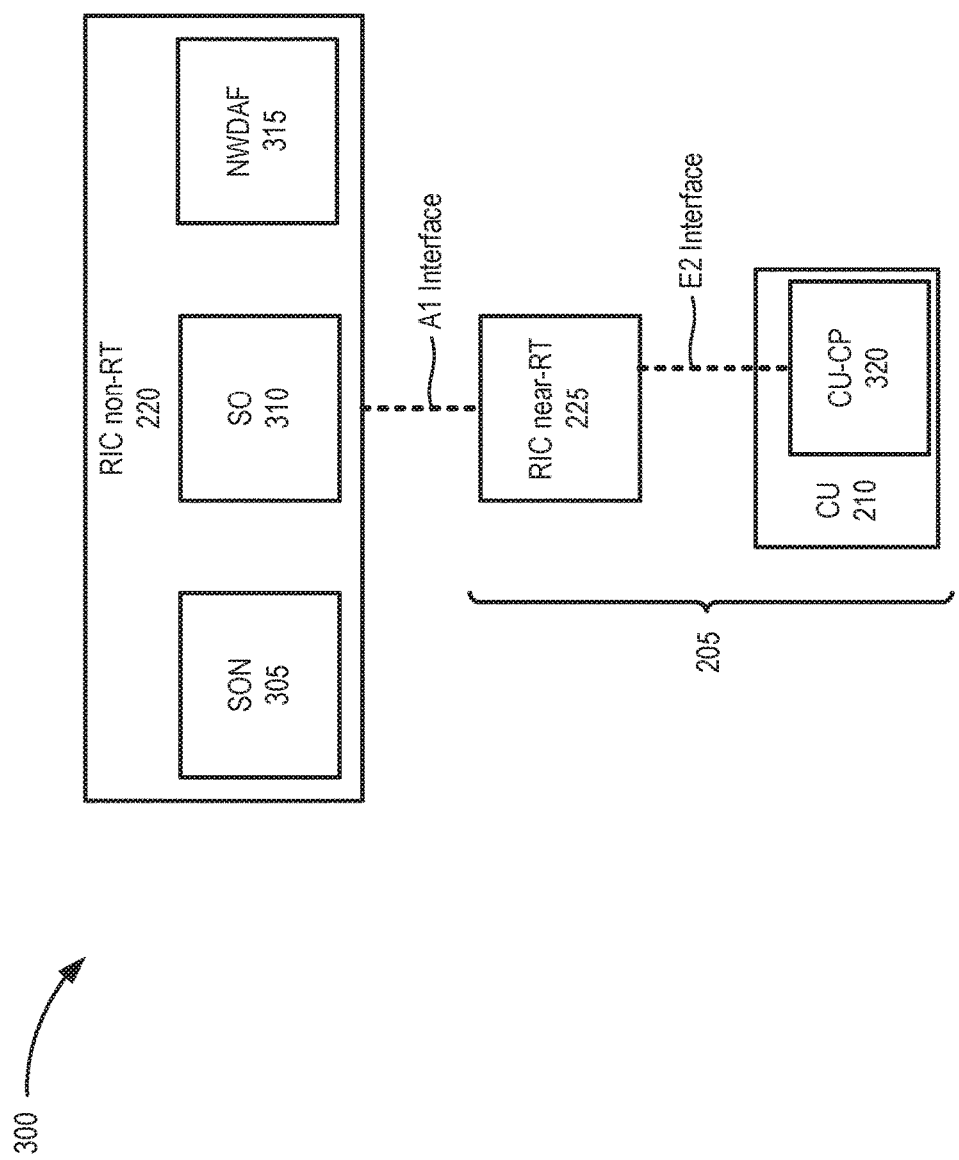

FIG. 3A-3C are diagrams illustrating an exemplary process for provisioning a gNB 205 with an AMF assignment table to support the intelligent AMF assignment service. As illustrated, an environment 300, which is consistent with network portion 200, includes RIC-non-RT 220, RIC-near-RT 225, and CU 210. RIC-non-RT 220 may include or communicate with a self-organizing network (SON) 305, a service orchestrator (SO) 310, and a network data analytics function (NWDAF) 315. CU 210 may include a user plane processing layer (not shown) and a call processing (CU-CP) layer 320.

SON 305 may enable automated optimizations of wireless networks and may be deployed at a scale to manage wireless networks, such as access network 110. SON functions may be used to enable discovery and optimization of access devices (e.g., access devices 115, gNB 205, etc.) neighbor lists, modification of antenna tilts or directions to improve coverage or capacity, changes to handoff parameters to reduce handover drops, adjustments to transmission power, and/or other types of parameters whose optimizations previously required laborious manual procedures.

SON 305 may obtain various metrics, also referred to as key performance indicators (KPIs), across a large number of access devices 115 and UEs 180, to perform autonomous analysis on the obtained metrics. The result of the analysis may indicate a change in one or more parameters of an access device 115 to optimize (i.e., improve) the functioning of access devices 115 in response to changing conditions.

SO 310 may automate sequences of activities, tasks, rules, and policies needed for on-demand creation, modification, or removal of network, application, or infrastructure services and resources. SO 310 provides orchestration at a high level, with an end-to-end view of the infrastructure, networks (e.g., access network 110 and core network 150), and applications.

NWDAF 315 may collect analytics information associated with access network 110 and/or core network 150. For example, NWDAF 315 may collect accessibility key performance indicators (KPIs, e.g., a radio resource control (RRC) setup success rate, a radio access bearer (RAB) success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs. In one implementation, NWDAF 315 may provide KPIs relative to specific AMFs 230, such as mobility management (e.g., number of attach attempts; number of successful attempts; number of failed attempts, organized by cause), session management (e.g., number of default, dedicated & total bearer activation attempts initiated by AMF; number of successful attempts; number of failed attempts, organized by cause; average, maximum dedicated bearer set up time; etc.); subscriber management (e.g., number of subscribers in IDLE and CONNECTED states, organized by PLMN); function management (e.g., alarm counts organized by severity, such as critical, major, minor) and causes); etc.

As shown in FIG. 3A, environment 300 may include an A1 interface (e.g., between RIC-non-RT 220 and RIC-near-RT 225) and an E2 interface (e.g., from RIC-near-RT 225 towards CU-CP 320). The A1 interface is an interface between an Orchestration/NMS layer containing RIC-non-RT 220 and a gNB 205 that includes RIC-near-RT 225. The E2 interface defines interactions between RIC-near-RT 225 and CU-CP 320 for functionality such as RRC management and mobility management to CU-CP 320.

Referring to FIG. 3B, communications over the A1 interface are shown to support creation of an AMF assignment table. Functions of RIC-non-RT 220 may forward data 332 for an AMF assignment table. For example, RIC-non-RT 220 may obtain and forward capabilities and capacities of different network slices and network functions in access network 110 and/or core network 150. In one implementation, SON 305 may provide RAN (e.g., access network 110) short term statistical data; SO 310 may provide network resource availability and network function readiness data; and NWDAF 315 may provide session metrics. As further shown in FIG. 3B, RIC-near-RT 225 may further collect local RAN data 334, such as up-to-date radio resource data and recent AMF assignment data observed in the local RAN.

RIC-near-RT 225 may receive forwarded data 332 and apply collected data 334 to compute an AMF assignment table 336 (also referred to as an AMF assignment policy). The AMF assignment table is described further below in connection with, for example, FIG. 4. The AMF assignment table may be computed and periodically updated by RIC-near-RT 225. For example, RIC-non-RT 220 may forward data 332 for an AMF assignment table at intervals of several minutes (e.g., less than 60-minute intervals), and RIC-near-RT 225 may compute and/or update the AMF assignment table after each interval.

Referring to FIG. 3C, communications over the E2 interface are shown to support delivery of the AMF assignment table to a local CU-CP 320. After calculating and/or updating the AMF assignment table, RIC-near-RT 225 may push the AMF assignment table to CU-CP 320. As further shown in FIG. 3C, CU-CP 320 may use the AMF assignment table to perform an AMF assignment table lookup 340 during a UE attach procedure. More particularly, CU-CP 320 may perform intelligent selection of an initial AMF (e.g., one of AMFs 230) in real time, during an UE registration procedure. CU-CP 320 may extract and use Network Slice Selection Assistance Information (NSSAI), provided by UE 180, and the updated AMF assignment table, provided by RIC-near-RT 225, to identify a best AMF 230 for the service or combinations services requested by UE 180. As described further herein, CU-CP 320 may select the best AMF 230 based on the UE 180 NSSAI, which is a collection of Single-NSSAIs (S-NSSAI). Using the AMF assignment table, CU-CP 320 may take into account individual slice priority, so that higher priority slices are matched to an appropriate AMF 230. CU-CP 320 may then send a Registration Request message for the UE 180 to the selected AMF.

Although FIGS. 3A-3C illustrate one arrangement of an environment 300, in other implementations, environment 300 may contain fewer components, different components, differently-arranged components, or additional components than depicted in FIGS. 3A-3C. For example, in another implementation, RIC-non-RT 220, RIC-near-RT 225, CU 210, SON 305, SO 310, and NWDAF 315 may be parts of a management and orchestration framework. Thus, communications described above in connection with FIGS. 3A-3C may use different communications interfaces to exchange data and provide the AMF assignment table than described above. Alternatively, or additionally, one or more components of environment 300 may perform one or more other tasks described as being performed by one or more other components of environment 300.

FIG. 4 is a diagram illustrating an exemplary embodiment of an AMF assignment policy for the intelligent AMF assignment service in the form of an AMF assignment table 400. As illustrated, table 400 may include an S-NSSAI field 410, and AMF field 420, and a slice priority field 430. As further illustrated, table 400 includes records 440-1 through 440-X (also referred to as records 440, or individually or generally as record 440) that each includes a grouping of fields 410, 420, and 430. The AMF assignment policy is illustrated in tabular form for the sake of description. In this regard, AMF assignment policy may be implemented in a data structure different from a table. The data fields and values are exemplary.

AMF assignment table 400 may indicate network slice priorities (e.g., for available slices in access network 110 and/or core network 150), based on network data from RIC-non-RT 220 and RIC-near-RT 225, to allow gNBs 205 to select an optimal AMF during initial UE registration. S-NSSAI field 410 may store an identifier of a network slice associated with S-NSSAI. AMF field 420 may store an identifier or address for an AMF 230 that services a corresponding network slice in S-NSSAI field 410. Slice priority field 430 may store a network slice priority value (e.g., where higher values have higher priority).

Referring to record 440-1, an AMF 230 (e.g., "AMF=w") is designated to handle UEs 180 that do not provide any S-NSSAI (e.g., S-NSSAI field 410 includes no data). Thus, UEs 180 with no S-NSSAI may be assigned a default set of slice identifiers.

Referring to record 440-2, an exemplary implementation introduces a "Default S-NSSAI," which can be provisioned into all UEs 180 (e.g., during device manufacturing). To support onboarding of such UEs 180 that do not receive further provisioning before coming online (e.g., requesting a connection to access network 110), CU-CP 320 may use table 400 to assign a specific set of network resources for these UEs, including a specific AMF (e.g., "AMF=x"). That is, AMF assignment table 400 defines which AMF 230 will handle UEs 180 with a default S-NSSAI.

Each selection choice (e.g., each record 440) is assigned a priority (e.g., in slice priority field 430) so that higher priority slices can be assigned an appropriate AMF 230 over lower priority slices (e.g., in the case where there is no common AMF 230 for all slices requested by UE 180). For example, referring to records 440-3 and 440-4, if UE 180 requested to use S-NSSAI=a and S-NSSAI=b, and there is no single AMF 230 that is available to handle both of those network slices, then the CU-CP 320 would select the AMF 230 for the S-NSSAI with the higher selection priority. In this example, of records 440-3 and 440-4, CU-CP 320 would select "AMF=z" because of the higher slice priority ("5") over "AMF=y."

According to other exemplary implementations, table 400 may store additional, fewer, and/or different instances of AMF assignment policy in support of the application-based access control service, as described herein. For example, in other implementations, AMF table 400 may include AMF set information. Furthermore, table 400 could be computed and updated on a regional basis to accommodate maximum flexibility. That is, AMF assignment policies for one geographic area (e.g., Raleigh-Durham, N.C.) may be different than AMF assignment policies for another geographic area (e.g., metropolitan New York).

Figure 5:
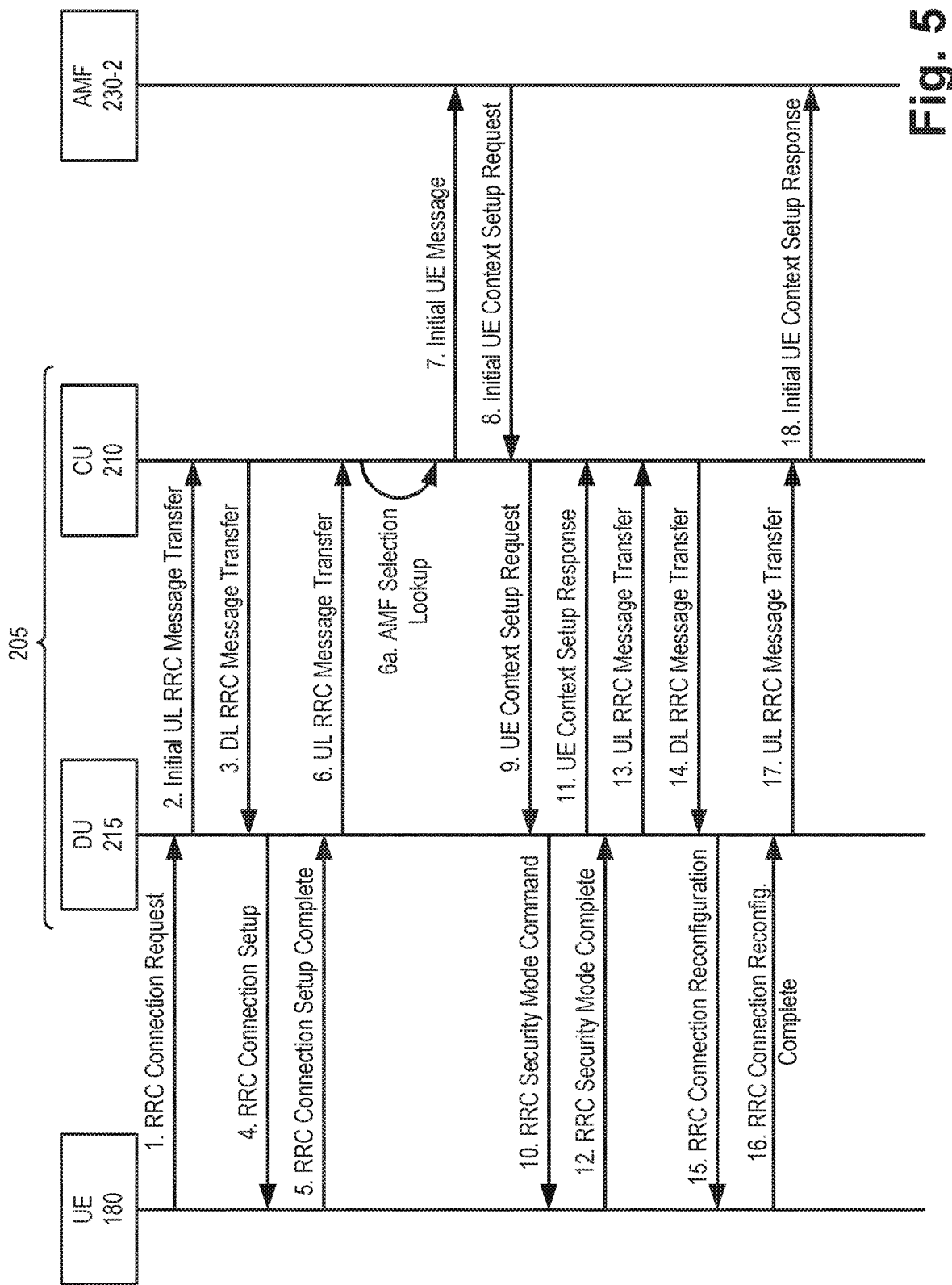
FIG. 5 is a signal flow diagram of an exemplary end device attach procedure using the intelligent AMF assignment service, according to an implementation described herein.

FIG. 5 is a signal flow diagram of an exemplary UE attach procedure using the intelligent AMF assignment service in a portion 500 of network environment 100. Network portion 500 may include UE 180, CU 210, DU 215, and AMF 230-2.

In step 1, UE 180 sends an RRC Connection Request message to DU 215. The RRC Connection Request message may include, among other information, an information element (IE) with NSSAI for UE 180. The NSSAI may include one or more provisioned S-NSSAIs or a default S-NSSAI (e.g., configured at the time of device manufacture). In step 2, DU 215 includes the RRC message and the corresponding low layer configuration for UE 180 in an Initial Uplink (UL) RRC Message Transfer message to CU 210. In step 3, CU 210 allocates a unique ID for UE 180 (e.g., unique within CU 210) and generates an RRC Connection Setup message towards UE 180. The RRC Connection Setup message is encapsulated in a Downlink (DL) RRC Message Transfer message. In step 4, DU 215 sends the RRC Connection Setup message to UE 180. In step 5, UE 180 sends an RRC Connection Setup Complete message to DU 215. In step 6, DU 215 encapsulates the RRC Connection Setup Complete message in an UL RRC message transfer message and sends the message to CU 210.

At step 6A, CU 210 (e.g., CU-CP 320) applies an AMF assignment table (e.g., AMF assignment table 400) to perform a real-time lookup procedure for UE 180. More particularly, CU 210 may identify one or more S-NSSAIs associated with UE 180 and identify any records (e.g., records 440) with matching S-NSSAIs. CU 210 may then identify particular AMFs (e.g., in AMF field 420) that service the S-NSSAIs associated with UE 180, and determine, based on priorities in table 400 (e.g., in slice priority field 430), the AMF 230 corresponding to the highest priority to service UE 180. Assume in the example of FIG. 5 that CU 210 selects AMF 230-2 to service UE 180.

In step 7, CU 210 sends an Initial UE message to the selected AMF 230-2. In step 8, AMF 230-2 sends an Initial UE Context Setup Request message to CU 210, and the context setup procedure continues on to steps 9 through 18, as shown in FIG. 5, whereby an initial UE context is established between UE 180 and the selected AMF 230-2 according to known message sequences.

Although FIG. 5 illustrates an exemplary process of the intelligent AMF assignment service, according to other exemplary embodiments, the process may include additional, different, and/or fewer steps. For example, in another implementation, UE 180 may provide NSSAI separately from an RRC Connection Request message. In another example, UE may provide NSSAI in the RRC Connection Setup Complete message of step 5.

Figure 6:
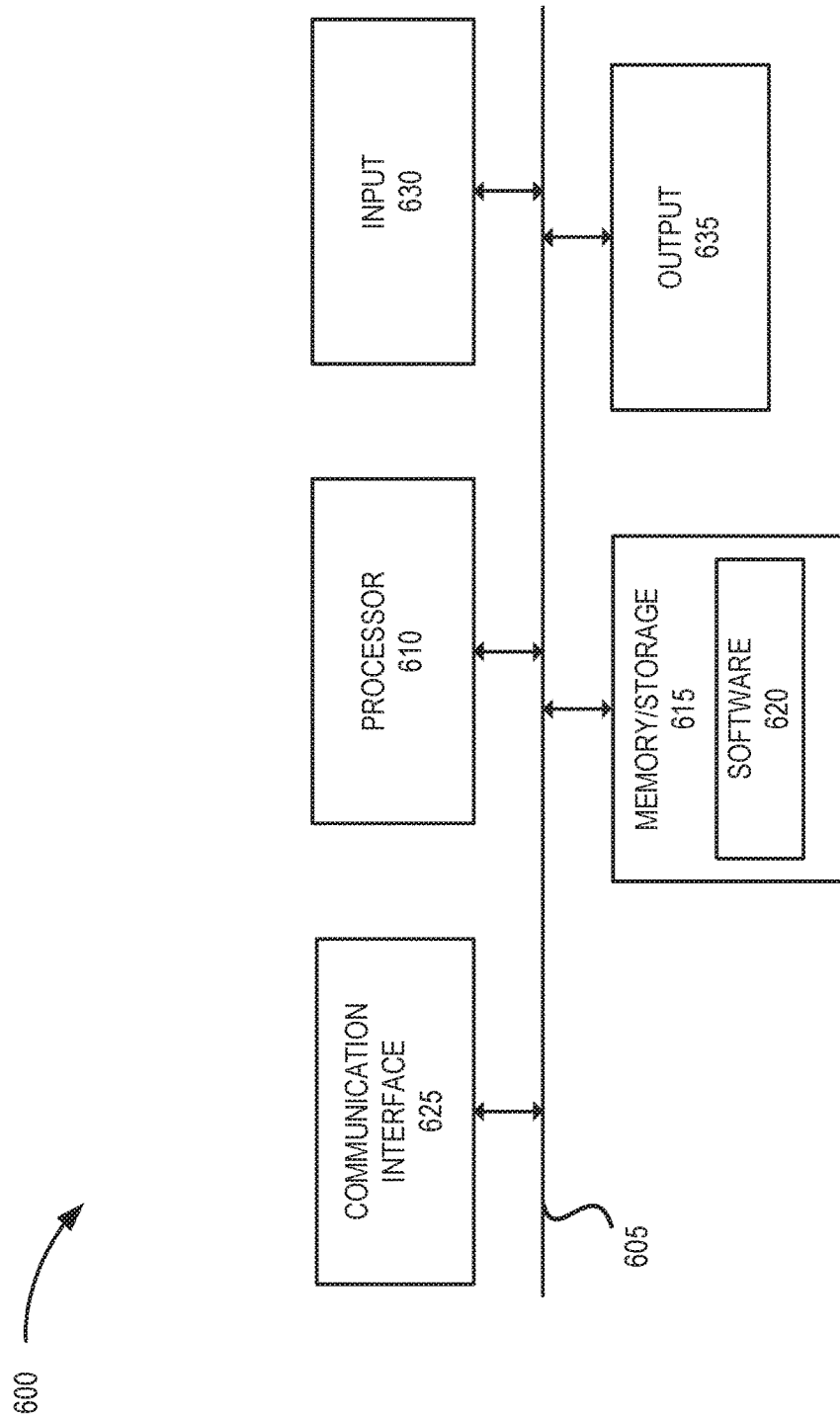
FIG. 6 is a diagram illustrating exemplary components of a device that may correspond to one or more of the devices illustrated and described herein.

FIG. 6 is a diagram illustrating exemplary components of a device 600 that may be included in one or more of the devices described herein. For example, device 600 may correspond to components included in access devices 115, core devices 155, UE device 180, gNB 205, RIC-non-RT 220, RIC-near-RT 225, or AMF 230. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with respect to access device 115 (e.g., CU 210 of gNB 205, etc.), software 620 may include an application that, when executed by processor 610, provides a function of the intelligent AMF assignment service, as described herein. Additionally, with another network device (e.g., RIC-non-RT 220, RIC-near-RT 225, etc.), software 620 may include an application that, when executed by processor 610, provides a function of the intelligent AMF assignment service, as described herein. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service based interface, etc.

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 600 may be implemented in the same manner. For example, device 600 may be instantiated, spun up, spun down, or undergo a life-cycle, using well-known virtualization techniques in a public/private cloud or other type of network.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Figure 7:
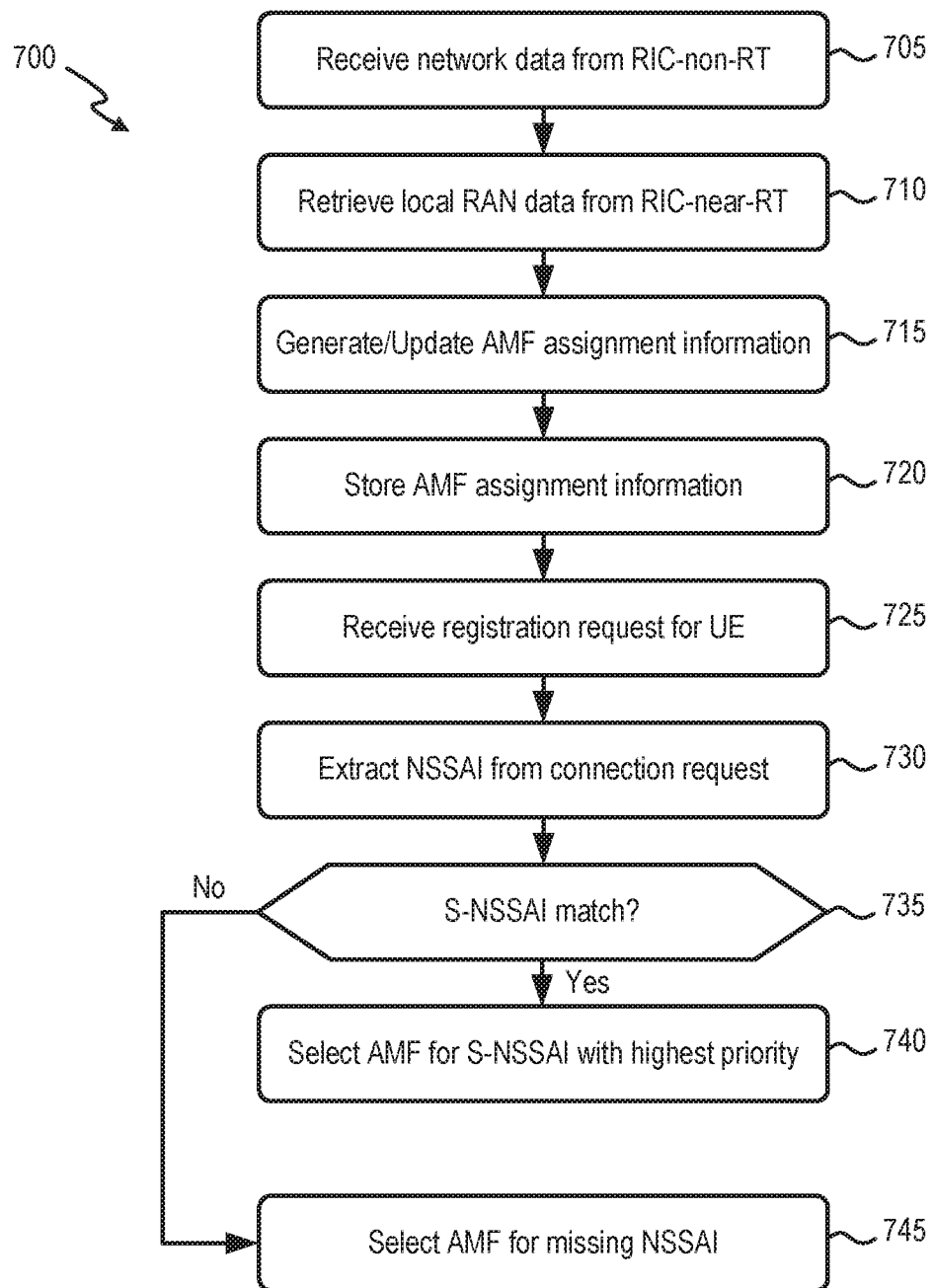
FIG. 7 is a flow diagram illustrating an exemplary process of an embodiment of the intelligent AMF assignment service, according to an implementation described herein.

FIG. 7 is a flow diagram illustrating an exemplary process 700 of an exemplary embodiment of the intelligent AMF assignment service. According to an exemplary embodiment, a network device of access network 110 performs steps of process 700. For example, the network device may be CU 210 of gNB 205. Additionally, for example, processor 610 may execute software 620 to perform a step illustrated in FIG. 7 and described herein. Additionally, or alternatively, a step illustrated in FIG. 7 may be performed by execution of only hardware.

In block 705, network data may be received from a RIC-non-RT. For example, RIC-non-RT 220 may obtain network data from SON 305, SO 310, and/or NWDAF 315 that may indicate capabilities and capacities of different network slices of network environment 100. RIC-non-RT 220 may periodically forward the network data to RIC-near-RT 225.

In block 710, local RAN data may be retrieved from a RIC-near-RT. For example, RIC-near-RT 225 may collect local RAN data, such as up-to-date radio resources and recent AMF assignment data observed in the local RAN that includes RIC-near-RT 225.

In block 715, an AMF assignment policy or information may be generated and/or updated. For example, RIC-near-RT 225 may generate or update AMF assignment table 400 and forward AMF assignment table 400 to gNB 205 (e.g., CU 210).

In block 720, the AMF assignment policy may be stored. For example, gNB 205 (e.g., CU 210) may receive AMF assignment table 400 from RIC-near-RT 225 and store AMF assignment table 400 in a local memory (e.g., memory/storage 615).

In block 725, a registration request for a UE may be received. For example, UE 180 may initiate an RRC Connection Request that is received at gNB 205 (e.g., DU 215). The RRC Connection Request may include NSSAI for UE 180. Alternatively, NSSAI may be missing from the RRC Connection Request.

In block 730, NSSAI may be extracted from the connection request. For example, gNB 205 (e.g., CU 210) may extract NSSAI, if available, from the RRC Connection Request. The NSSAI may include one or more S-NSSAIs requested by UE 180.

In block 735, it may be determined if there is an S-NSSAI match. For example, gNB 205 (e.g., CU 210) may compare the S-NSSAIs for UE 180 with AMF assignment table 400 to determine if one or more corresponding AMFs can be associated with the S-NSSAIs for UE 180.

If there is an S-NSSAI match in the assignment policy (block 735—yes), an AMF for the S-NSSAI with the highest slice priority may be selected (block 740). For example, assume the RCC Connection Request from UE 180 includes multiple S-NSSAIs. gNB 205 (e.g., CU 210) may use AMF assignment table 400 to identify corresponding records 440 that have the same S-NSSAIs as included in the RCC Connection Request. If table 400 indicates all of the S-NSSAIs identified by UE 180 can be serviced by a single AMF, CU 210 may select the appropriate AMF identifier (e.g., from AMF field 420) to service UE 180. If there is no single AMF in table 400 that is designated to provide services for all of the S-NSSAIs identified by UE 180, then the CU 210 may select a best available AMF 230. That is, CU 210 may identify the highest priority S-NSSAI in the RCC Connection Request (e.g., based on table 400) and select the corresponding AMF identifier from table 400 to service UE 180. The selected AMF 230 may service UE 180 for all of the S-NSSAIs identified in the RCC Connection Request.

If there is not an S-NSSAI match (block 735—no), in block 745, an AMF designated for missing NSSAI may be selected. For example, if no NSSAI (or no S-NSSAIs) are identified in the RRC Connection Request from UE 180, gNB 205 (e.g., CU 210) may select the AMF assigned for UEs 180 with missing NSSAI.

FIG. 7 illustrates an exemplary process 700 of the AMF assignment service, however, according to other embodiments, process 700 may include additional operations, fewer operations, and/or different operations than those illustrated in FIG. 7, and described herein. For example, the network device may perform block 735 in response to receiving a message from another network device during an attachment procedure. Additionally, for example, the network device may use other types of information (e.g., subscription information, end device capability information, etc.) to determine the network slice priority.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of signal flows and blocks have been described with regard to the processes illustrated in FIGS. 5 and 7, the order of the signal flows and blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory/storage 615.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   receiving, by an access device of a radio access network (RAN), an assignment policy for selecting an access and mobility management function (AMF) from a group of available AMFs, wherein the assignment policy includes network slice priorities for available network slices in the RAN,
   receiving, by the access device, a connection request initiated by an end device, wherein the connection request includes Network Slice Selection Assistance Information (NSSAI);
   identifying, by the access device and from the NSSAI, multiple single-NSSAIs (S-NSSAIs); and
   selecting, by the access device and based on the assignment policy, an AMF for a highest priority S-NSSAI, of the multiple S-NSSAIs.

2. The method of claim 1, further comprising:
   storing, by the access device, the assignment policy.

3. The method of claim 1, further comprising:
   receiving, by a network device of the RAN, network data that indicates capabilities and capacities for the available network slices, including capabilities and capacities over a core network, wherein the assignment policy is based on the network data.

4. The method of claim 3, wherein receiving the network data includes receiving the network data from one or more of:
   a self-organizing network (SON),
   a service orchestrator (SO), or
   a network data analytics function (NWDAF).

5. The method of claim 1, further comprising:
   collecting, by a network device of the RAN, local RAN data, including recent AMF assignment data; and
   sending, by the network device, the assignment policy to the access device.

6. The method of claim 1, wherein selecting the AMF for a highest priority S-NSSAI includes selecting the AMF when the assignment policy indicates there is no single AMF designated to provide service to the end device for all of the S-NSSAIs in the NSSAI.

7. The method of claim 1, wherein the access device includes a control plane function of a next generation Node B (gNB).

8. The method of claim 1, further comprising:
generating, by a network device of the RAN, the assignment policy.

9. A system comprising:
an access device of a radio access network (RAN) including a first processor to:
receive an assignment policy for selecting an access and mobility management function (AMF) from a group of available AMFs, wherein the assignment policy includes network slice priorities for available network slices in the RAN,
receive a connection request initiated by an end device, wherein the connection request includes Network Slice Selection Assistance Information (NSSAI),
identify, from the NSSAI, multiple single-NSSAIs (S-NSSAIs), and
select, based on the assignment policy, an AMF for a highest priority S-NSSAI, of the multiple S-NSSAIs.

10. The system of claim 9, further comprising a network device of the RAN including a second processor to:
receive network data that indicates capabilities and capacities for the available network slices, wherein the assignment policy is based on the network data.

11. The system of claim 10, wherein the network device receives the network data via an A1 interface from one or more of:
a self-organizing network (SON),
a service orchestrator (SO), or
a network data analytics function (NWDAF).

12. The system of claim 10, wherein the second processor is further to:
collect, local RAN data, including recent AMF assignment data.

13. The system of claim 10, wherein the second processor is further to:
send the assignment policy to multiple other access devices.

14. The system of claim 9, wherein the first processor is further to:
store, in a memory, the assignment policy.

15. The system of claim 9, wherein the access device includes a next generation Node B (gNB).

16. The system of claim 9, wherein the assignment policy further includes priorities for end devices that provide a default S-NSSAI and priorities for end devices that provide no NSSAI.

17. A non-transitory computer-readable storage medium storing instructions executable by a processor of a network device, which when executed cause the network device to:
receive an assignment policy for selecting an access and mobility management function (AMF) from a group of available AMFs, wherein the assignment policy includes network slice priorities for available network slices in a radio access network (RAN);
receive, from an end device, Network Slice Selection Assistance Information (NSSAI);
identify, from the NSSAI, multiple single-NSSAIs (S-NSSAIs); and
select, based on the assignment policy, an AMF for a highest priority S-NSSAI, of the multiple S-NSSAIs.

18. The non-transitory computer-readable storage medium of claim 17, further storing instructions executable by the processor of the network device to:
periodically receive an updated assignment policy for selecting the AMF from the group of available AMFs.

19. The non-transitory computer-readable storage medium of claim 17, wherein the assignment policy further includes priorities for end devices that provide a default S-NSSAI and priorities for end devices that provide no NSSAI.

20. The non-transitory computer-readable storage medium of claim 17, further storing instructions executable by the processor of the network device to:
send, to the selected AMF, a registration request for the end device.

* * * * *